Jan. 11, 1949.   J. PRISCO   2,458,917
MANNIKIN ADJUSTMENT DEVICE
Filed Oct. 19, 1946   2 Sheets-Sheet 1
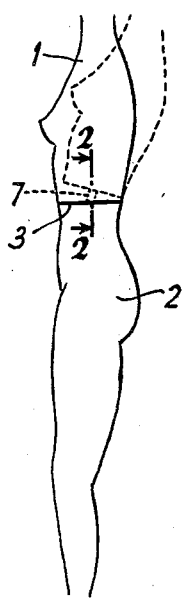
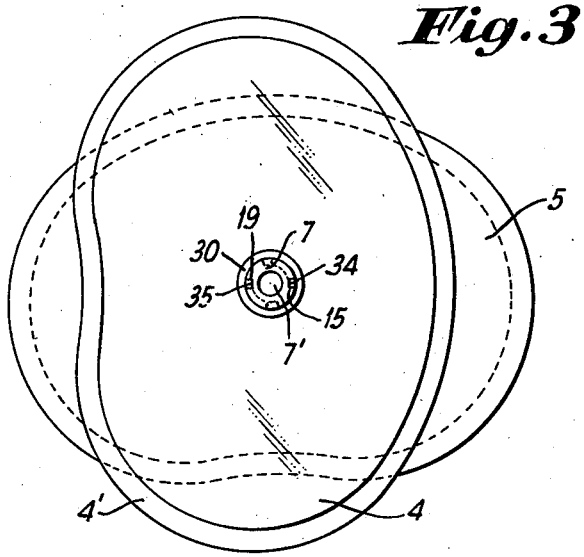
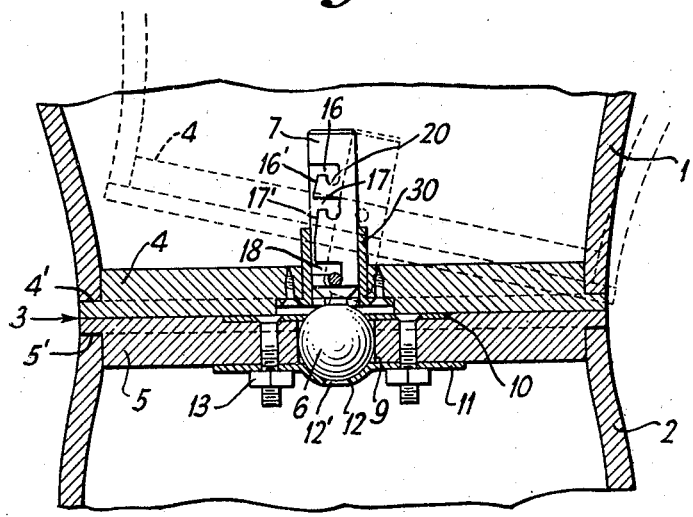
INVENTOR
JULIUS PRISCO
BY
ATTORNEY Jan. 11, 1949.  J. PRISCO  2,458,917
MANNIKIN ADJUSTMENT DEVICE
Filed Oct. 19, 1946  2 Sheets-Sheet 2
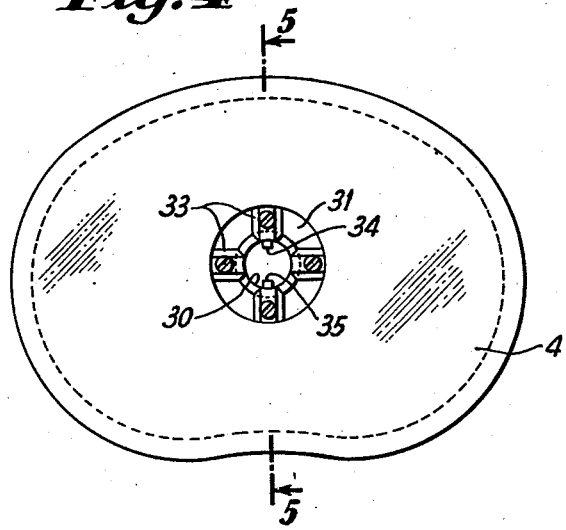
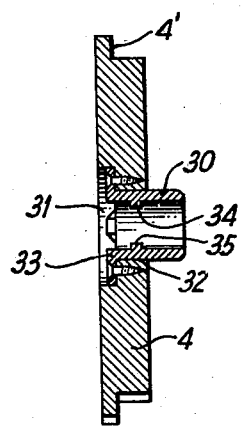
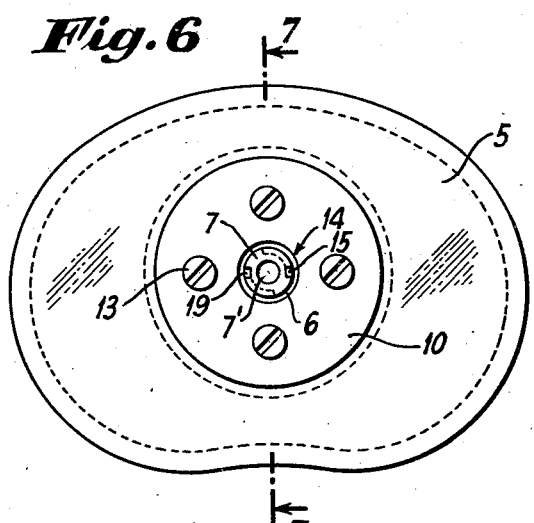
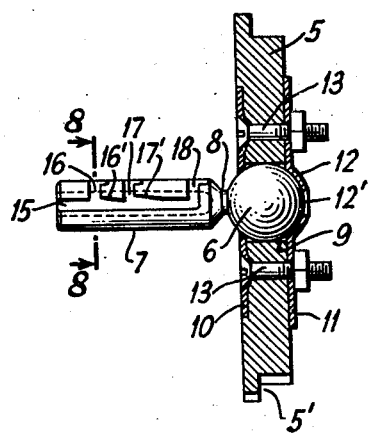
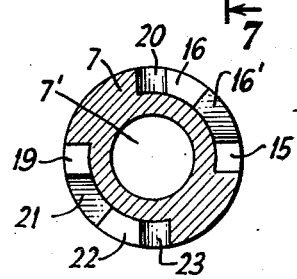
INVENTOR
JULIUS PRISCO
BY Abraham S. Greenberg
ATTORNEY Patented Jan. 11, 1949

2,458,917

UNITED STATES PATENT OFFICE 2,458,917

MANNIKIN ADJUSTMENT DEVICE

Julius Prisco, Yonkers, N. Y.

Application October 19, 1946, Serial No. 704,516

3 Claims. (Cl. 223—68)

My present invention relates generally to an improved mannikin adjustment device, and more specifically to a novel and efficient swivel coupling device between the bust and torso sections of a display form simulating the human figure.

In prior mannikins, or human display forms, it has been customary to use a common ball and socket joint between the bust and torso or waist sections, in order to provide tiltability. However, these prior swivel joints have had limitations so far as the display function is concerned. For example, in prior ball socket swivel joints there has always existed a substantial space at the mid-section of the form thereby making it necessary to provide a special concealment therefor. Again, prior devices of this type have had vertical adjustment provided by some form of manually adjustable contrivance.

It is an important object of my present invention to provide a mannikin adjusting device which is adapted to swivel at certain levels of vertical adjustment of the bust section, whereas at its lowest level adjustment there exists no perceptible spacing between the bust and torso sections.

It is a more specific object of my invention to provide a swivel joint for a display form, wherein the bust section may be selectively set in any one of a plurality of vertical positions without removing the hands from the bust section, i. e., selective level adjustment is secured by predetermined motion of the bust section relative to the torso section.

Yet a further object of my invention is to provide a highly improved ball and socket joint for the upper and lower sections of a mannikin, wherein the ball element is provided with a post or tube having a group of keyways or slots at different levels, the slots having a common vertical slot adapted to act as a shifting path or groove for the pin of a collar secured to the bust section.

I achieve the aforesaid objects in the manner illustrated in the accompanying drawings in which:

Fig. 1 is a fragmentary side elevational view of a mannikin, or display, device embodying the features of my present invention;

Fig. 2 is an enlarged fragmentary partial cross-sectional view taken substantially along the line 2—2 of Fig. 1, looking in the direction of the arrows;

Fig. 3 is a plan view of the swivel joint carrier plates in adjusting position as viewed from the bust section;

Fig. 4 is a bottom view of the bust carrier plate;

Fig. 5 is a sectional view taken along line 5—5 in Fig. 4, looking in the direction of the arrows;

Fig. 6 is a plan view of the waist section carrier plate;

Fig. 7 is a partial sectional view taken along line 7—7 of Fig. 6, looking in the direction of the arrows; and Fig. 8 is a sectional view taken on line 8—8 of Fig. 7, looking in the direction of the arrows.

Referring now to the accompanying drawings, wherein like reference characters in the several figures denote similar elements, in Fig. 1 the display device is a mannikin comprising the upper or bust section 1 and the separate lower torso or waist section 2. These sections conform to the general contour of the female figure, and it will be observed that the contour is smooth and graceful. The line 3 denotes the dividing line between the base face of section 1 and the top face of section 2. It will at once be appreciated that no space exists at region 3 of Fig. 1, despite the ball and socket joint construction employed in this device. The dotted position of bust section 1 in Fig. 1 shows how the bust may be raised to a higher level relative to region 3, and tilted at the higher level. In accordance with my invention the bust section may be adjusted in locked position to at least two separate levels above line or region 3, tilted or swivelled at each of these levels, and this may be accomplished by merely grasping the bust section 1 between the palms and shifting the bust section in a predetermined manner.

There will now be described the constructional details of the adjustment device. As is well known to those skilled in the display form art, the sections 1 and 2 are in the form of hollow bodies, the walls being usually composed of a lightweight material such as papier mâché. I provide respective closure plates (Fig. 2) 4 and 5 for the open adjacent ends of the bust and waist sections 1 and 2. These closure plates, preferably made of wood though not limited to that material, conform to the cross-sectional configuration of the display form at the trunk thereof. Thus, as shown in Figs. 4 and 6, the closure plates 4 and 5 are convex at the frontal edges, while they possess concavity at the dorsal edges to conform to the small of the back.

Each of the closure plates 4 and 5 is provided with a respective peripheral flange 4' and 5' whereby (Fig. 2) each plate 4 and 5 may be snugly fitted to the respective open end of the bust and waist sections. It will be understood that in the position shown in Fig. 1, as well as Fig. 2, the adjacent faces of plates 4 and 5 are in sliding contact. The closure plates 4 and 5, however, perform additional functions. Plate 4 acts as a carrier plate for a slidable collar provided with a locking pin. Plate 5 functions as the carrier plate for a ball and socket joint, the ball being provided with a level adjustment post which projects upwardly therefrom. In Figs. 4 and 5 I have shown the details of the plate 4 and its collar, while in Figs. 6 and 7 there are shown the constructional details of the plate 5 and its ball and socket joint and level adjustment post.

The plate 5 is provided with a simple and novel socket construction for the ball or sphere element 6. The level adjustment post 7 is integral with the ball element 6, and projects from the north pole thereof. If desired, the lower end 8 of post 7 could be threaded and screwed into a threaded tap provided at said pole of sphere or ball 6. The post 7 is preferably tubular, the numeral 7' designating the hollow interior of the cylindrical post 7. The plate 5 is provided with a central circular hole 9 whose diameter is substantially equal to the diameter of ball 6.

The ball 6 projects on either side of plate 5. The ball is maintained in the circular hole 9 by a pair of spaced metal discs 10 and 11. The disc 10 is mounted in a shallow circular depression provided in the upper face of plate 5, while disc 11 is bolted to the lower face of plate 5 concentrically with disc 10. While I have shown the disc 11 of somewhat greater diameter than disc 10, they may be of equal diameter. The disc 11 is provided with a central concave portion 12 which snugly conforms to the south polar area of sphere 6. The aperture 12' may be provided in concave section 12 for lubrication.

The threaded bolts 13, four in number, fixedly secure discs 10 and 11 in place so as to provide a normally tight socket for sphere or ball 6. The latter may be swivelled in any direction relative the upper face of plate 5 by virtue of the rolling contact of the enclosed surface of sphere 6. It will be noted that the central circular aperture 14 of disc 10 is in sliding contact with sphere 6. Suitable pressure on post 7, normally applied in any compass direction, will cause the sphere 6 to rotate in its socket. As shown in Fig. 2, the ball and socket joint is substantially embodied at the central portion of plate 5.

There will now be described the manner of constructing the plurality of vertical grooves and lateral slots in the external surface of the tubular post 7. For this purpose particular reference is made to Figs. 2, 7 and 8. As shown in Fig. 7, the post 7 is provided with a pair of opposed vertical grooves 15 and 19. These vertical grooves are diametrically opposed, as shown in Fig. 8, and each has a depth which is approximately half the thickness of the wall of tube 7. As shown in Fig. 7, groove 15 extends from the upper end of post 7 down to a short distance from the lower end 8. The groove 15 is common to a plurality of lateral grooves or slots 16, 17 and 18. These grooves are each provided with a respective dependent vertical locking groove, as pictured in Fig. 2. From Fig. 2 it will be observed that lateral groove 16 is located at a predetermined distance from the upper end of post 7. Further, the lateral groove 17 is spaced a substantially shorter distance below groove 16 than groove 18 is below lateral groove 17. Of course, the spacing between the three lateral grooves may be varied in accordance with the wishes of the designer.

It is to be clearly understood, as indicated in Fig. 8, that the groove or vertical slot 19 will be common to spaced lateral grooves constructed exactly in the same manner as has been described for the lateral grooves associated with vertical groove 15. In order securely to lock the bayonet pins of the collar element of plate 4, I have duplicated the bayonet pins and the pairs of vertical and lateral grooves on post 7. I have, also, provided for easy shifting of the bayonet pins from the common vertical grooves 15 and 19 into the respective lateral grooves.

This is accomplished by providing an inclined, or cam, surface for the walls 16' and 17' of vertical common groove 15. This, of course, would be true for the common vertical groove 19. By referring to Fig. 8 it will be seen that from the groove 15 there extends an inclined cam surface 16' to the lateral wall of groove 16 which ultimately feeds into the vertical locking groove 20. Correspondingly the vertical common groove 19 feeds into the inclined cam surface 21 to the lateral groove 22 which terminates in the vertical locking groove 23. The respective locking grooves 20 of the several lateral grooves 16, 17 and 18 are in vertical alignment, as shown in Fig. 2, and the plurality of aligned locking grooves 23 are diametrically opposite to the plurality of locking grooves 20.

Referring now to Figs. 4 and 5, it will be seen that the plate 4 is provided with a central circular aperture 32 to receive the collar 30. The upper face of plate 4 is provided with circular opening 32 whose diameter equals the external diameter of the collar 30, and the lower face of plate 4 is provided with a circular opening 31 which is of substantially larger diameter than the opening 32. The collar 30 is provided with a plurality of lugs 33 which are affixed in the circular opening 31, in any suitable manner, to the hub of plate 4. It will be noted from Fig. 5 that the collar 30 extends a substantial distance above the upper face of plate 4. The previously mentioned bayonet pins are designated by numerals 34 and 35, and are diametrically opposed. The pins project from the interior face of collar 30 at a point below the upper face of plate 4.

Preferably I choose the internal cross-sectional diameter of collar 30 to be substantially equal to the external cross-sectional diameter of post 7. This provides a snug sliding fit for collar 30 with respect to the post 7. In order to mount the collar 30 upon the post 7 it is merely necessary to fit pins 34 and 35 into the respective vertical grooves 15 and 19. This is clearly shown in Fig. 3 which depicts the plate 4 in its normal position relative to plate 5, and the respective pins 35 and 34 of collar 30 located in their respective vertical grooves 19 and 15 of post 7.

It will be observed from Fig. 3 that in order to reciprocate collar 30 on post 7, the pins 34 and 35 must be positioned in the respective vertical grooves 15 and 19. This is readily accomplished by rotating the bust 1 and its affixed closure plate 4 ninety degrees as shown in Fig. 3. If the pins 34 and 35 were initially positioned in the locking slots or grooves of the lowest lateral groove (18 and its opposed mate groove), then the bust is grasped by both hands and lifted and then rotated 90 degrees until it is felt that the pins are in the vertical grooves 15 and 19. This will mean that plates 4 and 5 are in the position of Fig. 3.

Assume that it is desired to raise the bust 1 in the intermediate level (lateral groove 17) where the bust can be swivelled relative to the section 2 on the ball and socket joint. This is simply accomplished by shifting the bust 1, still held as indicated in Fig. 3, upwards so that pins 34 and 35 slide in respective grooves 15 and 19. The cam surfaces (17' and its opposed mate) will guide the respective pins towards the lateral groove 17 (and its opposed mate), and the bust is now rotated 90 degrees to its original position where plates 4 and 5 register. The pins 34 and 35 will now readily slip down into the opposed locking grooves 20 and 23.

In Fig. 2 I have indicated in dotted lines the intermediate position of the locking pin 34, and I have, also, shown the bust 1 tilted at that intermediate level. The ball and socket joint permits rocking of the bust 1 and its plate 4 at the intermediate and upper levels. However, the lower setting of the bust permits no rocking of the bust 1, since the plates 4 and 5 are in direct contact at that position as clearly indicated in Fig. 2.

It is believed that those skilled in the display form art will readily understand how to shift the bust 1 into the top level (grooves 16 and 22). It will be noted that the inclined cam surfaces 16' and 21 will guide the pins into the locking grooves 20 and 23 (Fig. 8). The bust 1 is removed from post 7 by sliding collar 30 upwards, the pins 34 and 35 being in the vertical grooves, to the upper end of post 7. It is pointed out that the lower level adjustment of bust 1 (Fig. 2) is of value when it is desired to display garments of the bare midriff type, since there is no space between the sections 1 and 2 in that lowest setting.

In general, it will be understood that changes in the details herein described and illustrated may be made without departing from the scope of the invention. For example, the metallic elements, such as the ball 6, post 7, discs 10 and 11 and the collar 30, may be made of brass or cast iron or aluminum or any other suitable metal.

What I claim is:

1. In a display form conforming to the general contours of the human figure and comprising a hollow upper section and a separate hollow lower section, closure plates for the adjacent open ends of the sections, a ball and socket joint carried by the closure plate of the lower section, a level adjusting post projecting toward the upper section from the ball of said joint, a collar affixed to the closure plate of the upper section in axial alignment with the post and slidable therealong, said post being provided with a plurality of spaced lateral grooves and a common vertical groove feeding into said lateral grooves, and said collar being provided with a locking pin adapted to slide along the common groove into a desired one of said lateral grooves.

2. In a display form of the type comprising a bust section and separate waist section, an upper closure plate for the waist section, a universal ball and socket joint located at the center of the said plate, a post projecting from the ball element of the joint, a lower closure plate for the bust section, a collar located at the center of said bust plate, a pair of diametrically opposed locking pins projecting from the collar towards the interior thereof, said post being provided with a pair of opposed vertical slots thereby to permit vertical reciprocation of the respective pins upon sliding the collar along the post, a plurality of spaced lateral grooves associated with each vertical slot and a locking groove terminating each lateral groove.

3. In a human figure display form of the type described, a device for adjusting the level of the upper or bust section, said device comprising a vertical post and slidable collar, a locking pin projecting from the interior face of the collar, said post being mounted on the upper end of the waist section and being provided with a plurality of spaced lateral slots for the pin, a vertical slot common to the lateral slots for receiving said pin, and each lateral slot terminating in a locking slot for the pin.

JULIUS PRISCO.

REFERENCES CITED

The following references are of record in the file of this patent:

UNITED STATES PATENTS

| Number | Name | Date |
|---|---|---|
| 1,191,691 | Greenwald | July 18, 1916 |
| 1,880,798 | Cella | Oct. 4, 1932 |

FOREIGN PATENTS

| Number | Country | Date |
|---|---|---|
| 21,167 | Great Britain | Oct. 18, 1905 |